United States Patent

Thurre et al.

[11] 3,861,752
[45] Jan. 21, 1975

[54] ANTI-SKID DEVICE FOR WHEELED VEHICLES

[75] Inventors: Eugene Thurre, Martigny; Jean-Claude Roduit, La Batiaz-Martigny, both of Switzerland

[73] Assignee: Barry S.A., Geneva, Switzerland

[22] Filed: Oct. 16, 1972

[21] Appl. No.: 297,827

[30] Foreign Application Priority Data
Oct. 25, 1971   Switzerland..................... 15477/71

[52] U.S. Cl.................. 301/44 T, 152/216, 301/42
[51] Int. Cl.............................................. B60b 15/22
[58] Field of Search........... 301/400 S, 400 R, 41 R, 301/43, 440 R, 440 B, 44 T, 45; 152/167, 170, 208, 213 R, 213 A, 214, 216, 225; 305/54

[56] References Cited
UNITED STATES PATENTS
1,156,212   10/1915   Cook ................................... 301/42
1,347,018   7/1920    Dick ................................... 301/42
2,314,295   3/1943    Wampfler ........................... 305/54
2,886,138   5/1959    Bruner ................................ 188/4 B
3,132,682   5/1964    Fox ..................................... 152/216

FOREIGN PATENTS OR APPLICATIONS
870,719   3/1942   France .............................. 152/216
897,273   3/1945   France .............................. 152/216

*Primary Examiner*—Lloyd L. King
*Assistant Examiner*—Reinhard J. Eisenzopf
*Attorney, Agent, or Firm*—Emory L. Groff, Jr.

[57] ABSTRACT

An anti-skid device for wheeled vehicles comprises a hub-like support secured coaxially to a wheel and carrying equally spaced about its periphery a plurality of pivotally mounted arm and gripping member assemblies. Springs urge the assemblies either into a retracted rest position or a use position in which free ends of the gripping members lie over the road engaging surface of a pneumatic tyre on the wheel and spikes on said free ends provide a grip between the tyre and an icy road surface, the gripping members being able to pivot when the tyre flexes.

4 Claims, 4 Drawing Figures

ANTI-SKID DEVICE FOR WHEELED VEHICLES

The invention relates to an anti-skid device for wheeled vehicles.

Various well known types of anti-skid means, such as snow-chains and spike tires, are used with a view to facilitating traffic on snow-covered roads.

As is well known, the attachment of snow chains involves certain difficulties and requires an appreciable time in view of the various operations such as successively lifting the vehicle's wheels, or advancing and reversing the vehicle, which generally have to be accomplished in unpleasant conditions. Moreover, these or similar operations have to be repeated to remove the chains as soon as the vehicle returns to a dry, cleared or sanded road.

On the other hand, spike tires are generally permanently mounted during the winter and have certain well known disadvantages in "normal" driving conditions, for example an appreciable limitation to the maximum speed, noise, wear to the road surfaces and so on.

It has already been prosposed to equip agricultural tractors with anti-skid devices comprising a support fixed to the vehicle wheel and having crampons movable between a rest position and a use position. However, these known devices are only suitable for slow vehicles adapted to move over loose ground. Their use is not practical for high speed vehicles, such as passenger automobiles, since devices cannot repeatedly support impacts on hard road surfaces, for example ice covered road surfaces.

An object of the invention is to enable passenger automobiles trucks and similar wheeled vehicles to be equipped with anti-skid devices of the type already used for tractors, but which devices are able to support the particular operating conditions met with these relatively high speed vehicles which are mainly intended for use on hard surfaced roads.

According to a preferred embodiment of the invention, an anti-skid device for vehicle wheels comprises a hub-like support carrying a plurality of arms pivotally mounted thereon and disposed about a common centre, means for securing the support onto a vehicle wheel with said common centre co-axial with the wheel, each arm having pivotally mounted thereon a gripping member which can be moved between a rest position and a use position of the arm and member assembly, and stop means for each arm and its member for limiting the relative angular movement therebetween, each arm and member assembly having a spring attached to the support at a point spaced apart from the pivotal axis of the arm to the support and to the arm and member assembly, said spring elastically holding the assembly in either the rest or use position.

When this device is fitted to a vehicle wheel with a pneumatic tire, the gripping member can follow the profile of the tire when the tire flexes in contact with a road surface, without any substantial movement over the tire of a part of the gripping member contacting the tire.

An embodiment of the invention will now be described, by way of example, with reference to the accompanying drawings, in which.

Figure 1:
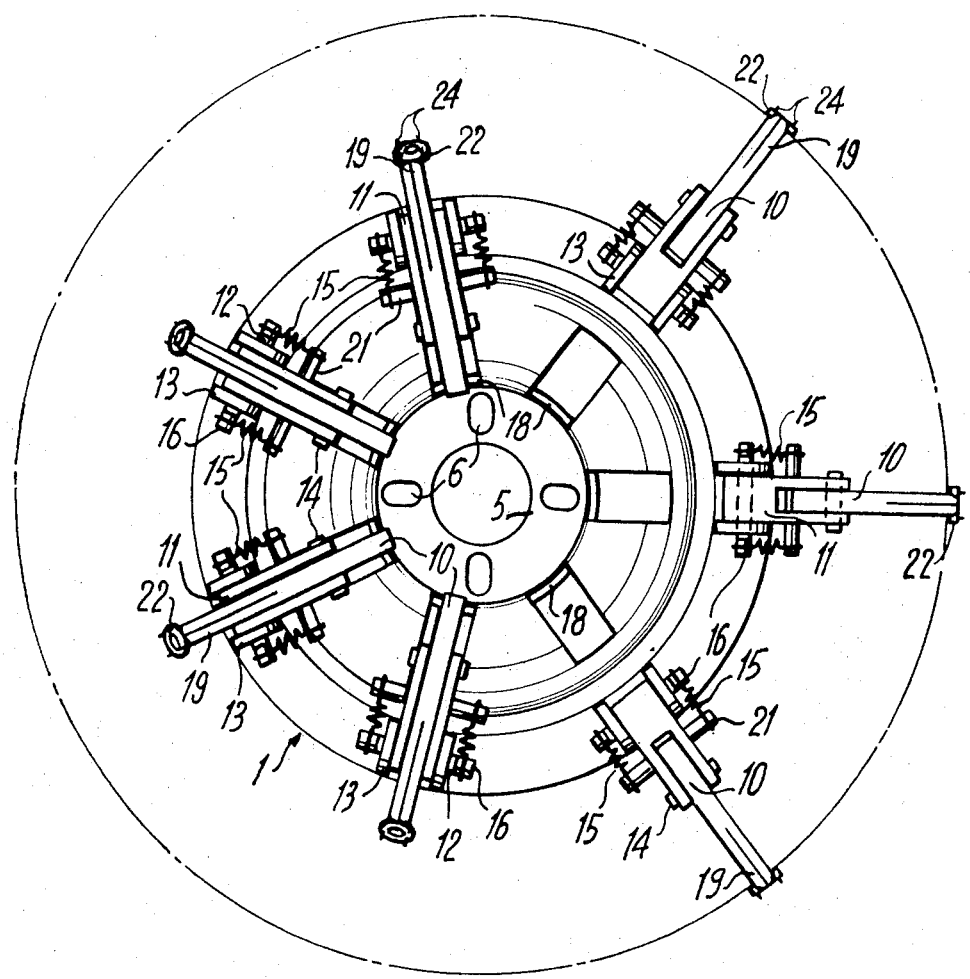
FIG. 1 is a side elevational view of a device according to the invention mounted on a vehicle wheel.

The device shown comprises a hub-like support in the form of a crown 1 in sheet steel which is fixed on a wheel 2 having a rim 3 on which is mounted a pneumatic tire 4, shown in broken lines. Crown 1 is fixed by its central part 8 onto a central part 5 of the wheel by means of the conventional bolts, not shown, on a vehicle hub which pass through oval apertures 6 in crown 1 and corresponding holes 7 in the central part 5 of the wheel.

When the crown 1 is mounted on the wheel 2, its outer peripheral edge 9 bears against the wheel rim 3. The central part of crown 1 has a double curvature to allow elastic displacement of its outer edge 9 in relation to central part 5 in a direction parallel to the axis of the crown, so that the crown may be fitted, with elastic deformation thereof, to wheels having different spacings between the plane of application of part 5 against the wheel and the plane where edge 9 contacts the rim.

Steel gripping members 10, of curved generally L-shaped configuration, are equally spaced about the outer periphery of crown 1, and are each connected to the crown by means of an arm 11 pivotally mounted on a pin 12 supported between two brackets 13 integral with crown 1, each member 10 being pivotally mounted to the free end of its arm 11 by a pin 14 secured on the arm.

The arms 11 are preferably each formed by an elastomer such as moulded rubber having an inner metallic reinforcing core. Each arm 11 moreover has a transverse pin 21 which serves, on the one hand, as a stop for the base 17 of member 10 and, on the other hand, as means for hooking the ends of two coil extension springs 15 disposed on either side of arm 11. The other ends of these springs are hooked onto lateral projections 16 on brackets 13.

Figure 4:
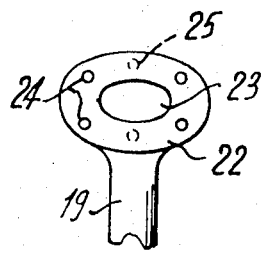
FIG. 4 is an enlarged scale fragmentary view of a free end of a gripping member.

FIG. 4 shows the free end part 19 of a gripping member 10, which is ring shaped and comprises an oval part 22 with a central aperture 23. On its outer face, part 22 has outwardly protruding spikes 24 which are adapted in use to strongly grip icy surfaces that may be encountered on a road. The inner face of part 22 has two inwardly directed protuberances 25 adapted in use to provide a strong grip between the running band 20 of tire 4 and member 10. Thus, a large part of the tractive force which is exerted tangentially to the wheel on the free end part 19 of member 10 is transmitted to rim 3 by tire 4, which relieves the pivoting pins 12 and 14 from having to support large stresses.

In the embodiment of FIG. 1, the anti-skid device comprises seven members 10. Four of these members are shown, in the left hand part of FIG. 1, in the rest or withdrawn position, and the three other members are shown in the right hand part of FIG. 1 in the use position. The retracted and use positions of a single member 10 are also respectively shown in FIGS. 2 and 3, the other members 10 and their associated arms having been omitted from these figures for the sake of clarity.

It can be seen that in the retracted position of each member 10, the springs 15 exert a traction on arm 11 and thus hold the base 17 of member 10 applied against a flat 18 on crown 1.

Figure 2:
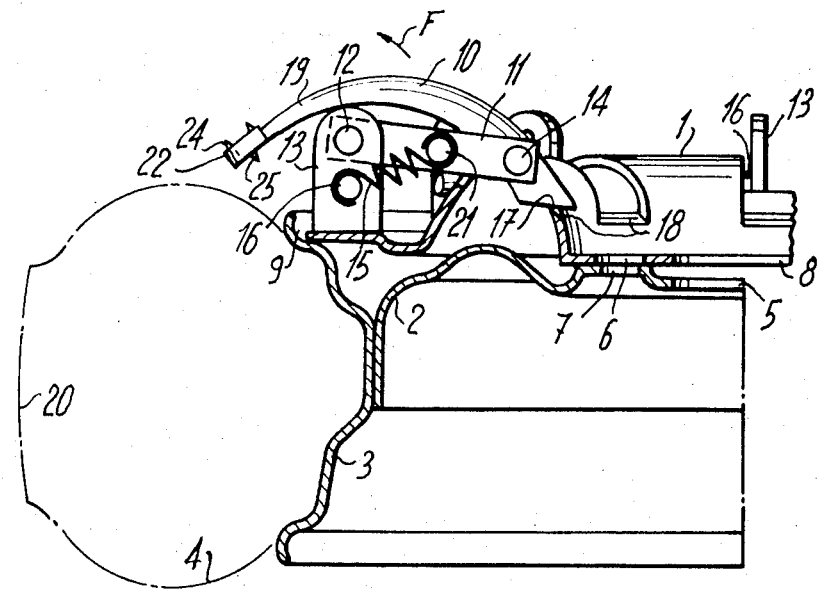
FIG. 2 is an enlarged-scale fragmentary radial cross-section of the device mounted as in FIG. 1 showing an arm and gripping member assembly in rest position.
Figure 3:
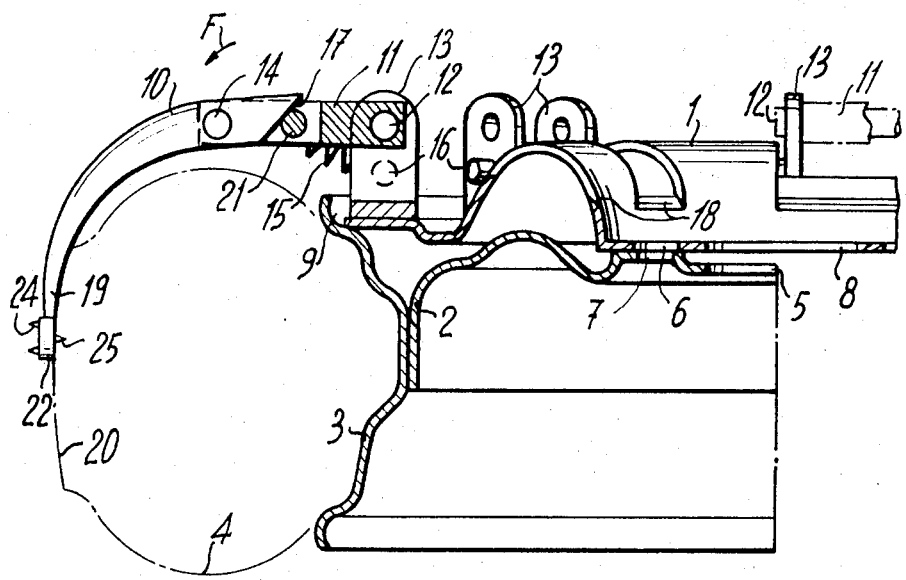
FIG. 3 is a view similar to FIG. 2 showing an arm and gripping member assembly in use position.

The member 10 is brought to its use position by pivoting arm 11 about its pin 12 in the direction of arrow F (FIG. 2). In the use position, the springs 15 exert a traction on each arm 11 in the opposite radial direction to the traction exerted in the retracted position. This tractive force is transmitted to member 10 by the pin 21 which forms a stop for limiting the possible angular displacement between the member 10 and its arm 11. In this manner, the curved part 19 of member 10 is applied against the road engaging surface 20 of tire 4 and can follow momentary deformations of the tire 4 when part of the tire is depressed during driving of the vehicle, without undergoing any appreciable transverse deformation in relation to the tire. In effect, upon each revolution of the wheel, when the part of the tire adjacent a member 10 is depressed, part 19 of member 10 moves radially inwards towards the center of the wheel, with a slight outward pivoting movement of arm 11, the arm subsequently being returned to the position of FIG. 3 by the action of springs 15. Any substantial rubbing between members 10 and the tire 4 is thus avoided, so that use of the device involves no particular wear or damage to the tire.

Also, because each spring 15 is fixed to the brackets 13 at a point spaced apart from the pivotal axis of arm 11 formed by pin 12, the arms 11 have two stable positions corresponding to the said rest and use positions. A "tumbler" effect is thus provided, since during each change of position of a member and arm assembly, the springs 15 pass through a dead centre point where the direction of the radial component of the traction exerted by the springs changes.

It can be seen that the gripping members 10 can easily be put into service, simply by pulling each one to the use position; this operation requires a minimal effort and time on the part of the vehicle driver, and does not require additional manoeuvres of lifting, advancing or reversing the vehicle. Moreover, the anti-skid device remains fixed on the vehicle during the winter period and, in the rest position, it does not create any disadvantage during normal driving on a dry road.

In the described example, the gripping members are disposed radially on a crown-shaped support; it is however clear that any other form of hub-like support could be previewed, for example star-shaped.

Moreover, instead of being carried by a single arm 11, members 10 could each be connected to the support by several arms, for example two arms one on either side of the member, or by two pivotally mounted arms forming opposed sides of a deformable parallelogram the two other sides of which are formed by the member and the support.

According to an advantageous variation, several pin-receiving holes could be provided in the arms 11 and/or in the members 10 to enable the same device to be mounted on wheels with different diameters. The length of the gripping member employed could thus be easily set according to the outer diameter of the tire of a wheel on which the device is mounted.

Of course, the crown 1 could also have means for securing a hub cap to conceal the crown 1 and the members 10 when in the retracted position, for example including resilient clips.

Moreover, the pivoting pins for the members 10 and arms 11 could be provided with elastic means for locking them in an axial direction, which is very advantageous when the anti-skid device is sold in the form of a kit of parts for assembly by the purchaser.

The described device also has the advantage that a wheel to which it is fitted can easily be accurately counterbalanced. Moreover, the device forms at the most only a slight and negligible axial protuberance from the wheel to which it is fitted.

We claim:

1. In combination with a vehicle wheel having a pneumatic tire with an outer running band, an anti-skid device comprising: a hub-like support secured to the wheel and carrying a plurality of arms pivotally mounted thereon and disposed about a common center lying on the axis of the wheel; a curved elongate gripping member pivotally mounted on each arm towards a free end thereof; each arm and gripping member being movable between a rest position in which the arm extends generally radially inwardly from its point of pivoting on the support and a use position in which the arm extends generally radially outwardly from its point of pivoting on the support, the gripping member extending as a continuation of the arm with a free end thereof passing over and against the running band of the tire; each arm and gripping member assembly including spring means acting between (a) a point of the support spaced apart from the axis of articulation of the arm thereon, and (b) the arm and gripping member assembly for resiliently holding the assembly selectively in the rest and use positions; said spring means comprising a pair of coil springs each connected at one end to said support and at the other end to said arm; and stop means for each arm and member assembly for limiting relative angular movement of the arm and member as the assembly moves into the use position but allowing pivoting of the member and the arm when the outer end of the member is depressed with the running band of the tire when said assembly is in a use position.

2. In combination with a vehicle wheel having a pneumatic tire with an outer running band, an anti-skid device comprising a hub-like support including a plurality of metal reinforced elastomer arms, means pivotally mounting said arms on said support, said arms disposed about a common center coaxial with the wheel, a generally arcuate tire engaging gripping member pivotally mounted on each of said arms, said gripping members and arms movable between a rest position and a use position, stop means for each arm and related gripping member for limiting the relative angular movement therebetween in one direction only, spring means attached to said arms and also attached to said support at a point spaced from the pivot means mounting said arms on said support, said spring means holding said gripping members and arms in either a use or non-use position, said gripping members when in a use position being movable radially inwardly towards the center of the wheel when that part of the tire adjacent a particular gripping member is flexed when engaging the surface of a roadway, said radially inward movement of the gripping members causing a slight outward pivoting of the related arm so as to provide sufficient clearance between the sidewall of the flexed portion of the tire and the gripping members and arms so that wear or damage to the tire due to frictional contact therebetween is avoided, said spring means acting to return said gripping members and arms to their previous position when the flexed sidewall returns to its unflexed position.

3. A device according to claim 2, wherein said support is made of sheet steel and is provided with a double curvature between its inner and outer peripheries to allow elastic displacement of the outer part thereof in relation to the inner part thereof in a direction parallel to the axis of the support.

4. A device according to claim 2 wherein the free end of each gripping member is ring shaped and has protuberances directed outwardly from an outer face thereof and inwardly from an inner face thereof, said outer protuberances forming means for providing a grip between the gripping member and an icy surface, and said inner protuberances forming means for providing a grip between the gripping member and a tire on said wheel.

* * * * *